Feb. 5, 1963   A. I. RUBIN ETAL   3,076,901
CIRCUIT FOR SEPARATELY INDICATING VOLTAGE MAGNITUDE
AND POLARITY OF ANALOG INPUT SIGNAL
Filed Jan. 11, 1960
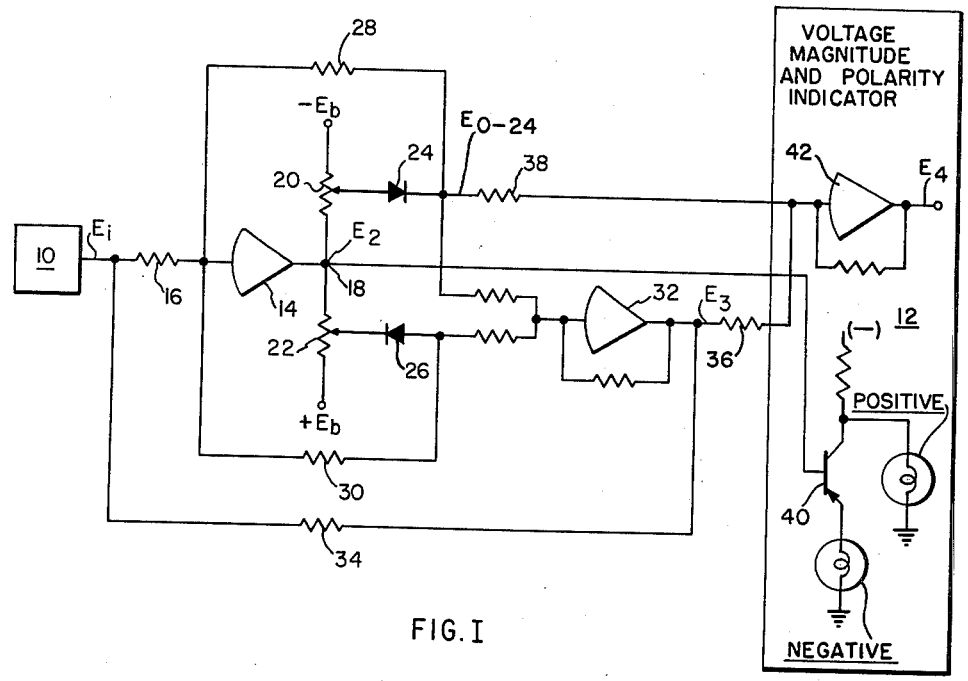
FIG. I
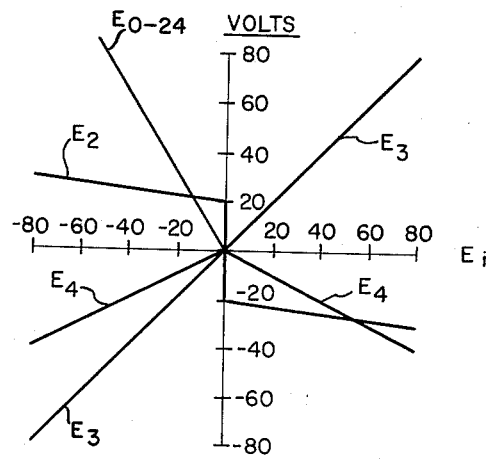
FIG. II
*INVENTORS.*
ARTHUR I. RUBIN
J. PAUL LANDAUER
BY Edward A. Petko
ATTORNEY

United States Patent Office 3,076,901
Patented Feb. 5, 1963

3,076,901
CIRCUIT FOR SEPARATELY INDICATING VOLTAGE MAGNITUDE AND POLARITY OF ANALOG INPUT SIGNAL
Arthur I. Rubin, East Brunswick Township, Middlesex County, and Jay Paul Landauer, South Brunswick Township, Middlesex County, N.J., assignors to Electronic Associates, Inc., Long Branch, N.J., a corporation of New Jersey
Filed Jan. 11, 1960, Ser. No. 1,738
5 Claims. (Cl. 307—88.5)

This invention relates generally to electronic switches and more particularly to such devices which provide plural output signals which accurately represent plural discrete conditions of a single input signal.

In the industrial and laboratory control and instrumentation field it is often necessary to continuously and accurately sample variations in analog quantities as represented by voltage levels or the like. More often than not, these analog quantities are applied to commercially available indicating, recording and/or controlling instruments, but on occasion these analog quantities are applied to commercially available coding devices, well known in the art as analog-to-digital converters, digital voltmeters, or the like, wherein they are converted to digitally coded signals to be utilized for indicating, recording and/or controlling the variations in the analog quantities.

In at least one such prior art coding device the need arises to sample independently the magnitude and the polarity of the analog quantities for separate utilization within the coding device. Such a coding device is described generally in copending application Serial No. 778,364 filed by James R. Patmore on December 5, 1958. In such a coding device the signals corresponding to the polarity of the analog quantities are utilized for purposes of actuating a suitable sign or polarity indicating means. The signals corresponding to the magnitude of the analog quantities are compared with reference quantities within the coding device to produce digitally coded signals representative of the magnitude of the input quantity. In order to simplify the over-all circuitry of the coding device, it is not unusual for it to utilize magnitude input signals of only one polarity. When the input analog quantities are of an opposite polarity to that required by the coding device, phase inversion of the input signal is first performed by switching it to the input terminals of a phase inverting amplifier by action of the input signal sensing or polarity indicating means. The accuracy of the digitally coded signals, usually derived from a comparison of the magnitude of the sampled analog quantity and a reference quantity, is dependent upon the accuracy with which the analog quantities are sampled and switched. Ultimate accuracy is assured when the analog quantities are sampled and switched without any significant distortion.

Electromechanical switching devices have been somewhat satisfactorily utilized as sampling devices but their very mechanical nature has materially limited the rate at which the analog information could be delivered to and handled by the coding devices. In order for the coding devices to process as much information as possible it was found necessary to actuate these switching devices at the upper limits of their mechanical capabilities with a consequential reduction in the over-all reliability of the digital intelligence provided by the coding devices.

The present invention, to be described in conjunction with one such prior art coding device, is directed to an improved sampling device which contemplates the use of electronic means and circuitry to overcome the deficiencies in prior art sampling devices. In its preferred embodiment the present sampling device utilizes a first amplifier circuit means having input and output terminals. The analog input quantities to be sampled are suitably coupled to the amplifier input terminals and means responsive to the polarity of the amplifier output provides feedback signals to the amplifier input terminals to insure linear amplification of the analog input quantities.

A second amplifier circuit means is coupled to the polarity responsive means and operative responsive thereto for producing unipolar output potentials, the magnitudes of which are absolute value reproductions of the analog input quantities, to be utilized within the coding device. Suitable impedance means couple the output from the second amplifier circuit means to the input terminals of the first amplifier means to prevent any significant current loading of the analog input quantity while suitable indicating means responsive to the polarity of an applied potential may be connected to the polarity responsive means to be operated by the potentials derived therefrom.

Accordingly, it is an object of the present invention to derive electronically plural discrete signals representative of plural discrete conditions of a single signal source.

Another object of the present invention is to sample electronically the magnitude and polarity of an input signal without current loading the input signal source.

Still another object of the present invention is to produce unipolar signals representative of the absolute magnitude of an input signal.

A further object of the present invention is to sample electronically the polarity and magnitude of an input quantity in an expeditious, efficient and reliable manner.

Another object of the present invention is to sample an input signal and responsive thereto to produce unipolar signals, representative of the absolute magnitude, and bipolar signals, representative of the polarity of an input signal without current loading the signal input source.

Other objects and advantages will become apparent from the following description taken in connection with the accompanying drawing, wherein:

FIG. 1 is a schematic diagram representative of the electronic switch of the present invention; and FIG. 2 is a signal schematic diagram which is helpful to understanding the invention of FIG. 1.

Referring now to FIGURE 1, there is shown an embodiment of this invention for sampling a source of analog potential 10 which may range through all values, both positive and negative, and which is to be applied to a suitable voltage magnitude and polarity indicator or coding device 12. The source 10 is connected to the input stage of a stabilized D.C. amplifier 14 by an input resistor 16. Amplifier 14 preferably has a high gain, wide band characteristic and may be stabilized by any suitable means, such as by the well known chopper stabilizing circuit, details of which are not essential to an understanding of the present invention. The last voltage amplifying stage of amplifier 14 has its output coupled from junction 18 to one end of each of a pair of similar potentiometers 20, 22. The other ends of potentiometers 20, 22 are each respectively connected to suitable sources of bias potential, designated as $-E_b$ and $+E_b$. The wiper arms of potentiometers 20, 22 are connected, respectively, to the anode and cathode of a pair of similar unidirectional conducting devices, illustrated as diodes 24, 26. Diode 24 has its cathode connected directly to the input stage of amplifier 14 by a resistor 28 while diode 26 has its anode connected directly to the input stage of amplifier 14 by a resistor 30.

The amplifier 14 is operated degeneratively by the circuit thus far described to maintain its input terminals substantially at ground potential and have an output potential $E_2$ appearing at the junction 18, which is a non-linear function of the analog potential $E_1$ coupled via the input resistor 16. The relationship, however, between the input potential $E_1$ and the output potential $E_0$, appearing at either the anode of diode 24 or the cathode of diode 26, is given by the well known expression (1) $$E_0 = -\frac{R_f}{R_i}E_i$$

where $R_f$ is the resistance of either of the feedback resistors 28 or 30 and $R_i$ is the resistance of the input resistor 16.

The output potential $E_0$ will appear at either the cathode of diode 24 or the anode of diode 26 in response to the conducting condition of these diodes, as determined by the polarity of the input potential $E_1$ and the phase inverting characteristics of amplifier 14. Furthermore, it should be apparent from Equation 1, that the output potential $E_0$ will be completely independent of either the settings of potentiometers 20 and 22 or the characteristics of the diodes 24 and 26.

The output potentials $E_0$ appearing at the diodes 24, 26 are coupled directly to the input circuit of a second stabilized D.C. amplifier 32 which may have characteristics similar to that of amplifier 14. The input and feedback resistors for amplifier 32 may be suitably proportioned, by way of example, to produce output potentials $E_3$ having a magnitude twice that of the magnitude of the input potentials $E_1$.

The output potential $E_3$ is thereafter suitably coupled to the input terminals of voltage magnitude and polarity indicator 12 to be therein compared with a suitable reference potential. The relative amplitude of the available reference potential and the characteristics of the indicator 12 will, of course, influence the magnitude and polarity of the input potentials which are required at the input terminals thereof. In the preferred embodiment of the present invention, and by way of example, it is assumed that the indicator 12 will respond only to potentials having a negative polarity and that it can accept and utilize the absolute magnitude of the input potentials $E_1$ without the requirement of reducing or increasing the magnitude thereof. Therefore, and to this end, the input terminals of indicator 12 are connected, respectively, via a pair of suitably proportioned resistors 36, 38, to the output terminals of amplifier 32 and to the anode of diode 24. Resistors 36 and 38 may comprise input resistors for a summing amplifier 42, which is shown disposed within the indicator 12 and which is provided with a suitably proportioned feedback resistor.

Thus, as illustrated in FIG. 2, the potentials $E_3$ and $E_{0-24}$ obtained via the resistors 36, 38 are added algebraically at the input terminals of indicator 12 and appear at the output terminal of the summing amplifier 42 as negative polarity potentials $E_4$. If the indicator 12 is selected to respond only to opposite polarity potentials, it should be apparent that resistor 38 could alternatively be connected to the anode of diode 26.

In order to prevent the electronic switch of the present invention from distorting the potential obtained from the source 10, a regenerative feedback path, resistor 34, is provided between the output terminal of the amplifier 32 and a point intermediate source 10 and the resistor 16. Resistor 34 is proportioned to provide a current balanced feedback system whereby the switch of the present invention represents only a potential burden, as distinguished from a current burden, for the source 10.

Switching of a suitable sign or polarity indicator within the voltage magnitude and polarity indicator 12 is accomplished responsive to the conducting conditions of the diodes 24, 26. To this end, the junction 18 is shown connected to the base of a transistor 40, which is disposed within the indicator 12 and which is biased between conditions of conduction and non-conduction in response to the polarity of the potential applied to the base thereof. A pair of incandescent indicating lights, labeled positive and negative, are shown to be connected to transistor 40 to indicate its conducting and non-conducting conditions, and accordingly the polarity of the input signals $E_1$. In a given state of the transistor 40, as when diode 24 is conducting, a positive potential is applied to its base to render it non-conducting and thereby permit energization of the positively labeled indicating light. In another state of the transistor 40, as when diode 26 is conducting, a negative potential is applied to the base thereof to render it conducting in order to energize the other or negatively labeled indicating light.

Depending upon the characteristics of the transistor 40, inaccuracies in switching may result when input signal $E_1$ passes through the condition of zero potential. For instance, when the input potential $E_1$ is in the order of a fraction of a microvolt, having just passed from a positive to a negative polarity, the magnitude of potential appearing at junction 18 may be insufficient to trigger transistor 40 from a non-conducting to a conducting condition. The action of diodes 24 and 26 insure positive switching of the transistor 40, responsive to the potential appearing at junction 18, and a suitable bias potential $E_b$, selected by appropriate adjustment of the potentiometers 20, 22, may be utilized to enhance the switching action of these diodes.

To illustrate the operation of the diodes 24, 26, assume first that $+E_b$ is in the order of magnitude of a positive 100 volts and that the potentiometer 22 is adjusted to impress a positive 20 volts between the junction 18 and the cathode of diode 26. It becomes apparent that, with a positive 20 volt bias impressed upon the diode 26, the amplifier output potential $E_2$, appearing at junction 18, must attain a magnitude slightly in excess of negative 20 volts before diode 26 becomes conductive and provides the necessary degenerative feedback for the amplifier 14. It has been found that the output of the amplifier, due primarily to the inherent high gain of the amplifier, will rise from zero amplitude to the required negative 20 volts in less than 10 microseconds.

Similarly, with potentiometer 20 adjusted to impress a negative 20 volt bias between junction 18 and the anode of diode 20, the potential $E_2$ must exceed slightly a positive 20 volt potential before diode 24 is rendered conductive. Thus, within the range of potential from $+20$ volts to $-20$ volts at the junction 18 it is apparent that the amplifier 14 functions without the benefit of degenerative feedback and has ideally under these conditions an infinite gain. Under these conditions of infinite gain, the input sensitivity of the amplifier is substantially infinite, whereby it responds rapidly to infinitesimal current unbalance. Thus, as illustrated in FIG. 2, the potential $E_2$, appearing at junction 18, is seen to have a sharp transition from a positive 20 volts to a negative 20 volts, or vice versa, as the input potential $E_1$ passes through zero from one polarity to another polarity. With junction 18 connected to transistor 40, it is apparent that sharp triggering is achived and positive indication of the polarity of input potential $E_1$ is assured.

The bias potential attributable to potentiometers 20, 22 need not be symmetrical about the zero point of input potential $E_1$ to insure proper switching of the transistor 40, but need be adjusted only to conform to the desired transistor switching operation. Moreover, in some circumstances it has been found that the normal or usual voltage drop across diodes 24 and 26 is of a sufficient magnitude to insure a sharp transition in the magnitude of the potential appearing at junction 18. In this latter instance the potentiometers and the sources of biasing potential may be eliminated and the diodes may be connected directly to the junction 18 for the purpose of driving a low voltage transistor.

While only one embodiment of this invention has been shown and described herein and inasmuch as this invention is subject to many variations and modifications and reversals of parts, it is intended that all matter contained in the above description shall be interpreted as illustrative and not in a limiting sense.

We claim:
1. In an electronic switching apparatus, the combina- tion comprising a first amplifying means having an output terminal and having an input terminal connected to an input signal source, degenerative feedback circuit means connected between said input and output terminals and including a pair of asymmetrically-conducting elements connected in a parallel but opposed sense, algebraic summing means including a second amplifying means connected to the output terminals of said pair of elements for producing output signals of only one polarity, and polarity indicating means connected to the output terminals of said first amplifying means and triggered between conditions of conduction and nonconduction in response to the output signals therefrom.

2. In an electronic switching apparatus, the combination comprising a first amplifying means including input and output terminals for inverting the polarity of an applied input signal, degenerative feedback circuit means connected between said input and output terminals and including a pair of asymmetrically-conducting, potential-biased elements connected in a parallel but opposed sense, algebraic summing means including a second polarity inverting amplifying means connected to receive output signals from said pair of elements and for producing output signals of only one polarity, and polarity indicating means connected to the output terminals of said first amplifying means and triggered between conditions of conduction and nonconduction in response to the output signals therefrom.

3. In an electronic switching apparatus, the combination comprising a first amplifying apparatus including input and output terminals for inverting the polarity of an applied input signal, degenerative feedback circuit means connected between said input and output terminals and including a pair of asymmetrically-conducting diode elements connected in a parallel but opposed sense, algebraic summing means including a second polarity inverting amplifying means connected to receive output signals from said pair of elements and for producing output signals of only one polarity, and means connected to the output terminal of said first amplifying means for indicating the polarity of output signals therefrom.

4. In an electronic switching apparatus, the combination comprising a first amplifying means including input and output terminals for inverting the polarity of a signal applied to said input terminal from a signal source, degenerative feedback circuit means connected between said output and input terminals and including a pair of asymmetrically-conducting elements connected in a parallel but opposed sense, second amplifying means for inverting the phase of an applied signal having an input terminal connected to receive signals from said pair of elements, means for algebraically summing the output from one of said pair of elements with the output from said second amplifying means to produce signals of only one polarity, a regenerative feedback circuit connected between the output of said second amplifying means and the input of said first amplifying means to prevent current loading of the input signal source, and means connected to the output terminal of said first amplifying means for indicating the polarity of the output signals therefrom.

5. In an electronic switching apparatus, the combination comprising a first polarity inverting amplifying means having an input terminal connected to a bipolarity input signal source, degenerative feedback circuit means connected between said input and output terminals and including a pair of asymmetrically-conducting, potential-biased elements connected in a parallel but opposed sense, algebraic summing means including a second polarity inverting amplifying means connected to receive output signals from said pair of elements and for producing output signals of only one polarity which are magnitude related to the signals from the signal source, a regenerative feedback circuit connected between the output terminal of said second amplifying means and the input terminal of said first amplifying means to prevent current loading of the input signal source, and means connected to the output terminal of said first amplifying means for indicating the polarity of the output signal therefrom.

References Cited in the file of this patent

UNITED STATES PATENTS

| | | |
|---|---|---|
| 2,683,806 | Moody | July 13, 1954 |
| 2,819,397 | Davis | Jan. 7, 1958 |
| 2,832,886 | Morrill | Apr. 29, 1958 |
| 2,935,608 | Mirzwinski | May 3, 1960 |

OTHER REFERENCES

Seely: "Electron Tube Circuits," McGraw-Hill, N.Y., 1950, pp. 355 and 346 relied on.

Baum: "Diode Limiters Simulate Mechanical Phenomena," Electronics, November 1952, pages 122 to 126 relied on.

Bennett et al.: "High-Speed Relays in Electric Analogue Computers," published by Electric Engineering, vol. 70, No. 12, December 1951, page 1083.

Shea: "Principals of Transistor Circuits," published by Wiley, N.Y., 1956, page 164 relied on.